E. J. LOVEGROVE.
TREATMENT OF WASTE TINS.
APPLICATION FILED AUG. 9, 1917.
1,363,332.
Patented Dec. 28, 1920.
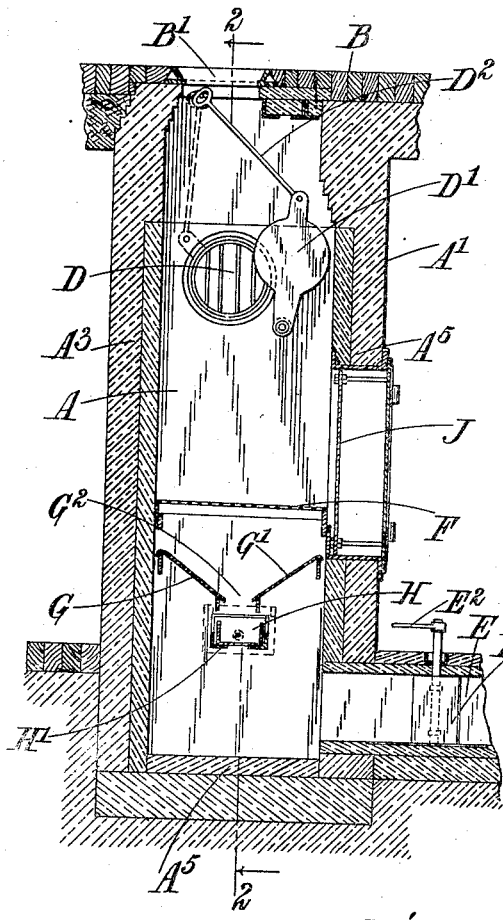
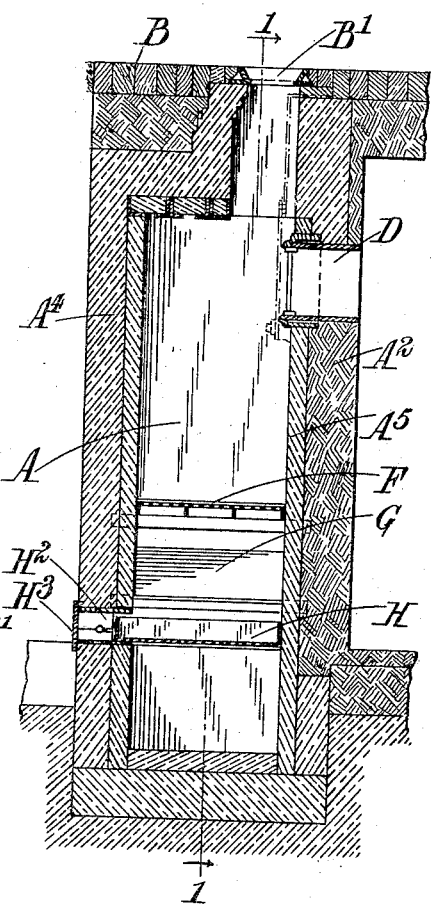
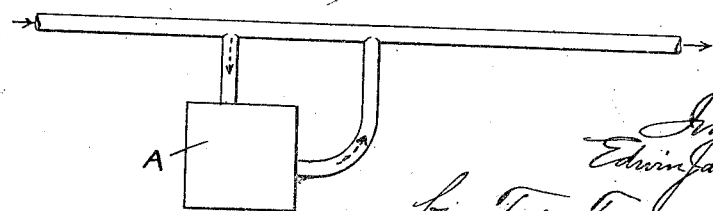
Inventor
Edwin James Lovegrove
by Foster Freeman Watson & Cort
Attys

UNITED STATES PATENT OFFICE.

EDWIN JAMES LOVEGROVE, OF LONDON, ENGLAND.

TREATMENT OF WASTE TINS.

1,363,332.  Specification of Letters Patent.  Patented Dec. 28, 1920.

Application filed August 9, 1917. Serial No. 185,376.

*To all whom it may concern:*

Be it known that I, EDWIN JAMES LOVE-GROVE, a subject of the King of England, residing in London, England, have invented certain new and useful Improvements in the Treatment of Waste Tins, of which the following is a specification.

The present invention comprises the combination with the waste-gases conduit belonging to any furnace, for instance to a dust-destructor or to a steam generator, of a chamber separate from the said furnace and employed to receive the waste tins, means for diverting a portion or the whole of the waste combustion-gases from the said conduit to cause them to heat the chamber when desired, and means for collecting the solder melted from the tins.

The said waste combustion-gases are preferably caused to flow through the chamber to effect the heating thereof.

The present invention comprises also the combination with the waste-gases conduit belonging to any furnace of the chamber for treating waste tins that is constructed substantially as hereinafter described.

In the ordinary method of recovering solder from waste tins, the soldered tins are separated from others and are placed in a furnace heated with coke, oil, or other fuel or burned in an open fire with wood shavings or other combustible material. This latter is ignited and the solder is melted off the tins and collected with a considerable amount of dross. The unsoldered tins also are burned to rid them of tin and various adhering deposited matter, the process ordinarily adopted being to burn them in a furnace or open fire with wood or other combustible material either before or after they are baled.

It was found, however, that the process resulted in wastage owing to a considerable amount of dross being formed with the solder and undue expenditure in respect of sorting, handling, and burning, and in the making of separate fires for each batch of soldered or unsoldered tins.

Accordingly the present invention has for its object the treatment of waste tins by means of waste heat from any furnace, *e. g.* from the waste gas conduit through which the combustion-gases pass on their way from the furnace of a steam-boiler or a refuse-destructor toward the chimney.

Due to the fact that excess of oxygen is fed to the combustion chambers of steam boilers or refuse destructors, oxygen is present in the products of combustion.

According to the present invention, the chamber in which the waste tins are treated is arranged adjacent to the waste-gas conduit aforesaid and is provided with two passages communicating therewith so that it can be heated by passing the waste gases, or a portion thereof, through it; suitable dampers or valves are provided on the connecting passages to shut off the chamber, or to divert the required amount of waste gases into it when required.

It will be appreciated that the exact design and construction of the chamber will be varied according to the special circumstances of any particular case; the drawings hereto annexed illustrate one particular construction which is given by way of example.

In these drawings—

Figure 1 is a vertical section on the line 1—1 of Fig. 2,

Fig. 2 is a vertical section on the line 2—2 of Fig. 1, and

Fig. 3 is a diagrammatic drawing showing the course of the flue gases through the apparatus.

Like reference characters indicate like parts in both the figures.

The chamber A has walls $A^1$ $A^2$ $A^3$ $A^4$ built of any suitable heat-resisting material. If desired, a fireproof lining $A^5$ may be provided on the interior to protect the walls of the chamber. The chamber is arranged with its top on a level with the tipping platform B, a suitable opening $B^1$ to provide communication with the chamber being fitted with a removable cover, not shown in the drawings.

This chamber is constructed adjacent the flue of the steam-boiler or other waste gas conduit aforesaid and a passage D in the wall $A^2$ is arranged to communicate with such flue or other waste-gas conduit. The passage D opens into the chamber A near the top and is provided with a valve or damper $D^1$. Any type of damper may be used and in that illustrated a plate $D^1$ is pivotally mounted to swing across, and close, the end of the passage D, being operated by a suitable handle D² which is accessible in the mouth B¹ of the chamber.

The bottom of the chamber A has communication, by a passage E, with another part of the flue or waste-gas conduit at a point nearer to the outlet from the same than is the point at which the passage D communicates with the same flue, so that the passage D, chamber A and passage E constitute a by-pass to a portion of the main flue. A suitable damper E¹, with a controlling handle E², controls the passage E. The function of the passages D and E and the valves or dampers D¹ E¹ is to permit the hot gases from the flue or waste-gas conduit aforesaid to flow through the chamber A, or to shut them off from the chamber as may be required.

A suitable grate F is provided in the chamber A and beneath it two baffle-plates G G¹ are provided. These plates extend the full width of the chamber as shown in Fig. 2, and slope downward toward the center, as shown in Fig. 1, but they are so dimensioned as to leave a space G² between their lower edges. The flue gases entering by the passage D pass downward through the space G² and leave by the passage E.

Beneath this space G² there is mounted a removable trough H which is carried on suitable guides H¹. The trough can be removed through an opening H² in the wall A⁴ of the chamber (see Fig. 2), and, if desired, a cover H³ may be provided for this aperture.

A door J is fitted in the wall A¹ of the chamber to provide means for removing the tins after they have been treated in it. Any suitable construction of door may be used, but it will be appreciated that it should be such as will withstand the heat to which the chamber is subjected.

The method of using this chamber is as follows:—

The waste tins are dropped into the chamber A through the opening B¹ on the tipping platform B. There is no need to separate the soldered tins from the unsoldered tins as has heretofore been the case. While the chamber is being filled, the dampers D¹ and E¹ are both so positioned as to close the passages D and E respectively.

When the chamber is filled, the passages D and E are opened and the top B¹ of the chamber is closed. The hot gases from the waste-gas conduit or flue then enter by the passage D and pass downward through the chamber A, through the space G² and out by the passage E to the flue. The temperature of these gases is sufficient to free the tins of any adhering deposited matter and to melt the solder which drains off them and, passing downward through the grate F, falls into the trough H or on to the baffles G G¹ and thence into the trough H.

As soon as the de-soldering and burning process is completed, the flue gases are shut off by operating the dampers D¹ and E¹ as no further heat is required. The tins are then removed from the chamber through the opening provided by the door J and their further treatment is the same as has hitherto been the ordinary practice. That is to say the tins have been sufficiently burned to destroy the coating of tin so that this no longer interferes with the subsequent use of the steel which may then be pressed and baled ready for removal to steel works or other works for utilization.

The matter adhering to the tins which has been burnt off, causes the presence of a certain amount of dross, and when the tins are removed from the furnace, the dross which falls off them when they are withdrawn through the door J, is collected as it contains a certain amount of solder.

The solder collected in the trough H has a certain amount of dross mixed with it, and in order to reduce this to a minimum, the trough H is withdrawn during the filling and emptying of the chamber and a separate trough is inserted in its place. The second trough catches any debris from the tins which would otherwise collect in the bottom of the chamber A and in the flue E. By using a separate trough, this debris is kept separate from the solder collected while the chamber is in operation.

While a particular construction of chamber for treating tins has been described and illustrated, it will be appreciated that the precise details of construction may be varied to suit any particular circumstances without departing from the spirit of the invention as set forth in the appended claims.

It will be appreciated that this chamber offers several advantages over other devices used for burning and recovering solder from waste tins. In the first place the trouble and cost of independently-fired furnaces is entirely obviated since the only source of heat used is the flue gases from the waste-gas conduit or flue. There is no need to sort out the unsoldered tins before treating them in this furnace, the process of de-soldering and burning off the tins being performed in one operation, and the cost of working thereby reduced. Finally, the waste of solder and cost of refining same is very much reduced.

It has before been proposed to treat waste tins in a chamber provided with perforated walls and situated in the main flue of a dust-destructor so that a portion of the flue-gases passes through it. It will be seen that the present invention offers several advantages over the construction previously proposed since the chamber for the tins does not offer any obstruction to the free flow of the gases through the main flue, and moreover, can be shut off entirely from the flue-gases during the process of filling and emptying, and also when it is not required to be used.

What I claim as my invention and desire to secure by Letters Patent is:—

1. Apparatus of the character described including in combination, a container adapted to immovably hold a charge of waste tins, means to conduct flue gases from a furnace to the container and through the charge, said gases containing oxygen, means for controlling the flow of said gases through the charge, and means to collect the materials melted from the tin.

2. Apparatus of the character described including in combination, a container adapted to immovably hold a charge of waste tins, means to by-pass the products of combustion from a furnace through the charge said products of combustion containing oxygen, and means to control the flow of said product through the charge, said container having a grate to immovably support the charge, and a removable tray below the grate to receive the solder melted from the tins.

3. The process of treating waste tins to recover the solder and burn off the refuse deposited thereon, consisting in, charging the tin in a fire-proof container, by-passing hot flue gases containing oxygen through the tins, collecting the melted solder, shutting off the flow of gases to the tins, removing the collected solder, and subsequently removing the cleaned tins.

In testimony whereof I have signed my name to this specification in the presence of two subscribing witnesses.

EDWIN JAMES LOVEGROVE.

Witnesses:
 HAROLD WADE,
 HARRY S. BRIDGE.